May 4, 1926.
G. B. SHIPLEY
TIE LOADING DEVICE
Filed June 19, 1925
1,583,018
3 Sheets-Sheet 1
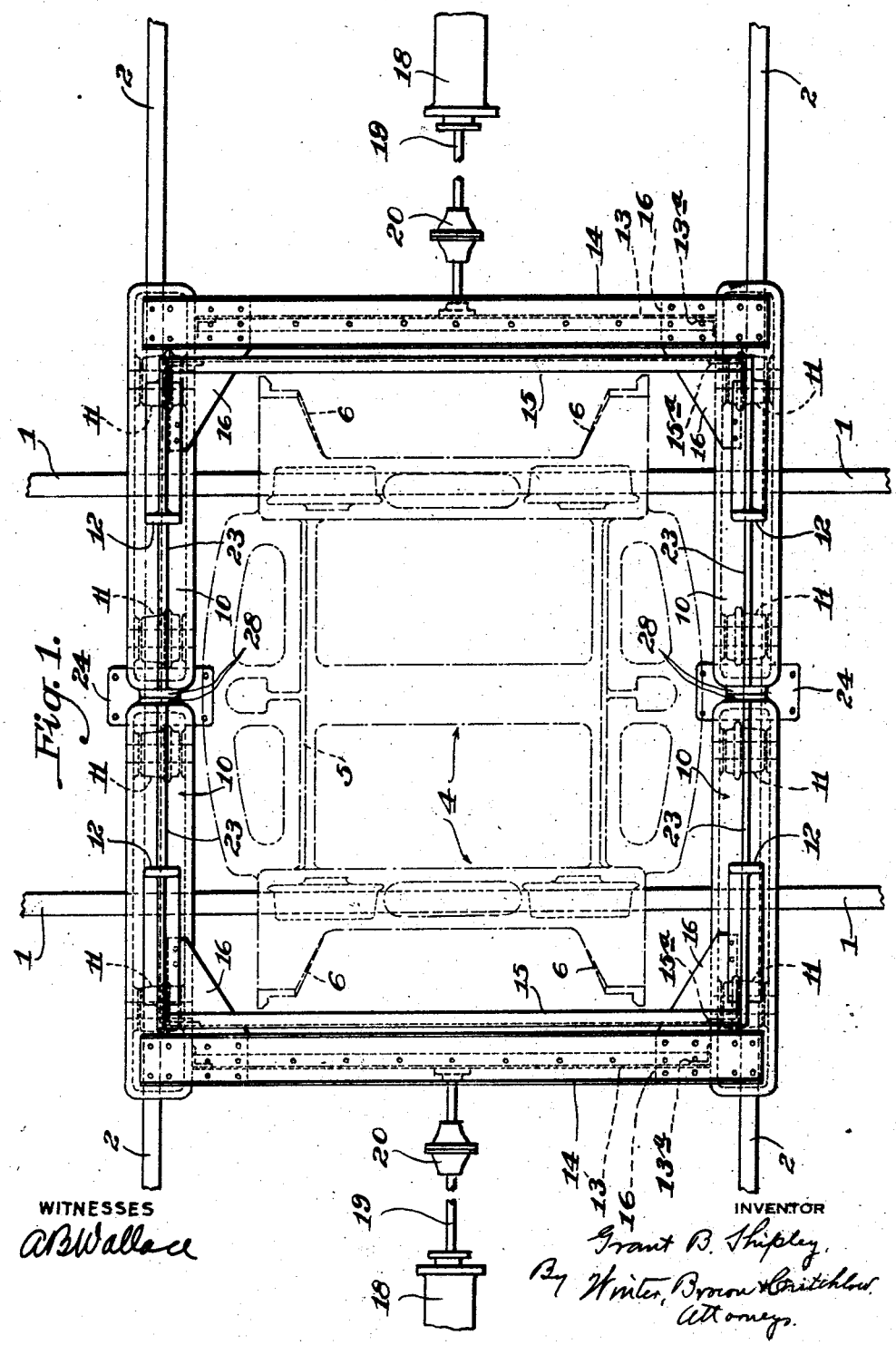

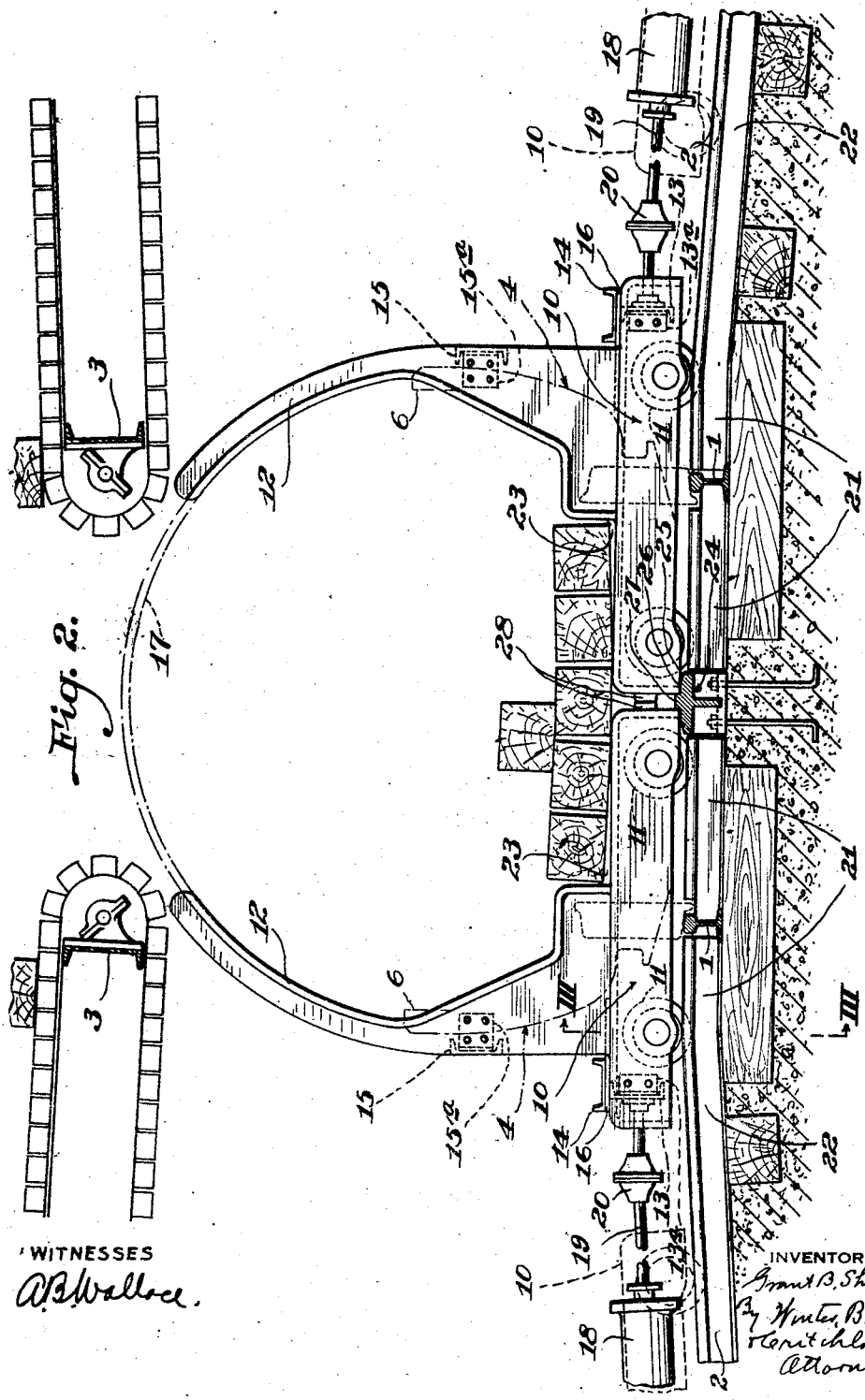

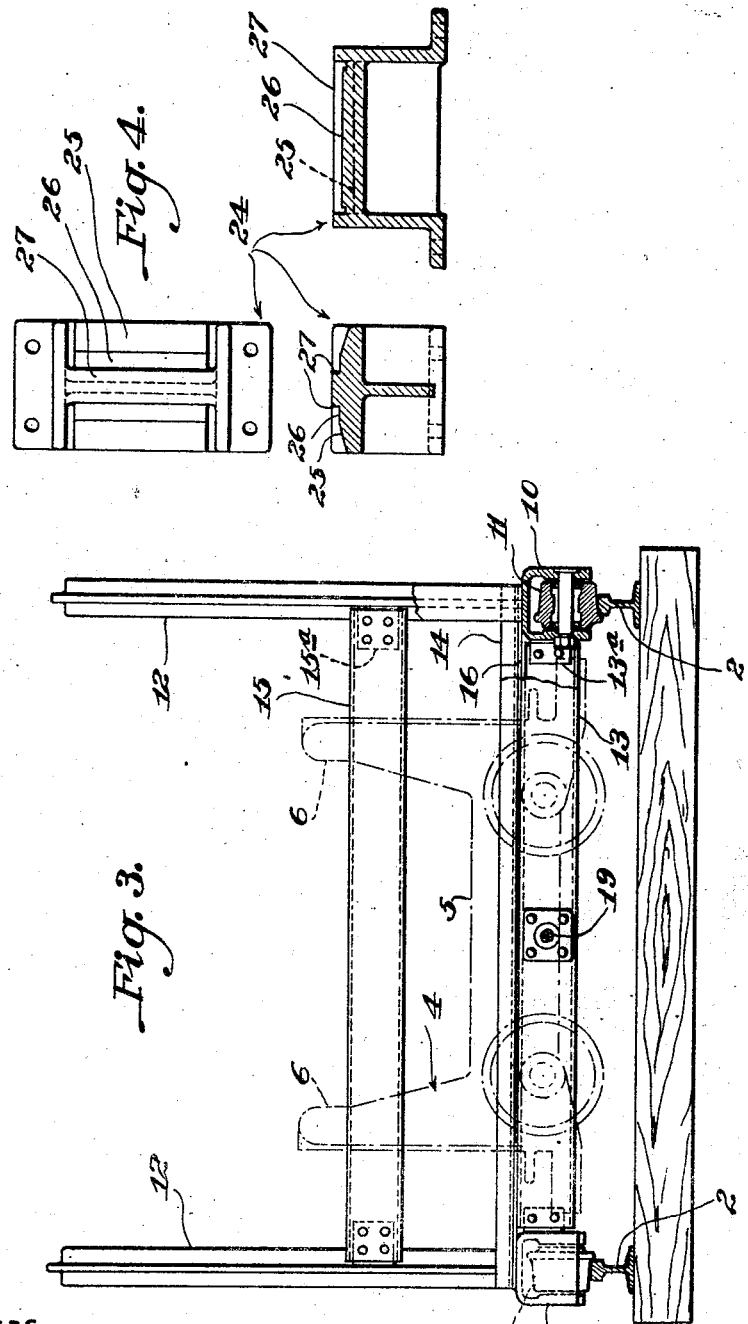

Patented May 4, 1926.

1,583,018

UNITED STATES PATENT OFFICE.

GRANT B. SHIPLEY, OF PITTSBURGH, PENNSYLVANIA.

TIE-LOADING DEVICE.

Application filed June 19, 1925. Serial No. 38,219.

*To all whom it may concern:*

Be it known that I, GRANT B. SHIPLEY, a citizen of the United States, and a resident of Pittsburgh, in the county of Allegheny and State of Pennsylvania, have invented a new and useful Improvement in Tie-Loading Devices, of which the following is a specification.

The invention relates to mechanism for loading timbers and the like on trucks, and more particularly for loading railroad ties on trucks or trams on which they are carried to and into treating cylinders or tanks.

The object of the invention is to provide mechanism whereby the ties as delivered to it, preferably by power conveyors, are so assembled as to form a load of a width and height suitable for the truck, and after assembly are deposited on the truck, said loading mechanism being arranged to hold the assembled ties in assembled relation until they are secured to the truck or tram by a bail or chain, and being so designed that it, instead of the truck, receives the shocks or blows of the falling ties, thus relieving the truck of the hammering of the ties and avoiding injury thereto.

The invention comprises the construction and arrangement of parts hereinafter described and claimed.

In the accompanying drawings Fig. 1 is a plan view showing the loading device and the truck or tram to be loaded, the tracks on which both are movable, and one means for moving the loading device; Fig. 2 is an end elevation of the same, showing the loading device in closed position, and also showing conveying mechanism for delivering the ties to the loading device; Fig. 3 is a side elevation of the loading device, partly in vertical longitudinal section, on the line III—III, Fig. 2; and Fig. 4 represents detail views of means for positioning the members of the loading device in closed position.

The loading device illustrated and now to be described is designed particularly for assembling ties and despositing them on trucks or trams of the construction illustrated and described in my application filed concurrently herewith, Serial No. 38,218. These trucks or trams run on a track and are successively brought underneath conveying mechanism which delivers the ties to the loading device, which at this time spans the truck or tram to be loaded, so that the ties delivered by the conveying mechanism drop onto the loading device and not directly on the truck or tram. The loading device consists of two oppositely facing like members movable toward and from each other, and which when in closed position span the truck or tram as above stated and in this condition receive the ties as they fall from the conveying mechanism, and when moved apart allow the assembled ties to settle down upon the truck or tram, whereupon said truck or tram is moved away on its track, and an empty truck or tram brought into position under the delivery end of the conveying mechanism, when the loading mechanism is again closed to span a new truck or tram, and the operation repeated.

In the drawings 1 indicates the track on which the trucks or trams to be loaded run; 2 indicates a track at right angles to the track 1 on which the loading device is movable; and 3 (Fig. 2) indicates the ends of power conveyors in position to deliver ties to the loading device.

The truck or tram 4 to be loaded is indicated in broken lines in Figs. 1, 2 and 3. It comprises a suitable frame with carrying wheels, a bottom 5 on which the ties rest, and four uprights or standards 6 rising from its four corners. This truck receives the ties lengthwise of itself. The uprights or standards slope upwardly and outwardly, as shown in Figs. 1 and 2, so that when said truck is piled high with ties the load approximates a circle in cross section, to approximate the shape of the chamber of the treating cylinder.

The loading device consists of two similar oppositely facing members each comprising end portions and longitudinal connectors. Each end portion is formed as a casting and comprises a base 10 and an upright or standard 12 rising from near its outer end. The bases 10 are of inverted hollow box-like structure and in them are housed and journalled the wheels 11 which run on the track 2. The uprights are of the form best shown in Fig. 2 and will assemble the ties in an approximately circular load. The end portions of the loader members are spaced apart a distance greater than the length of the truck or tram to be loaded, and their bases 10 are entirely free at their inner ends, as is clear from Figs. 1 and 2. These end portions are united one with the other by means lying outside of the truck or tram, the connecting means shown comprising three channel bars 13, 14, and 15. The channel bar 13 is placed with its web vertical and is connected by angle plates 13ª to the inner face of the bases 10 near their outer ends. The channel bar 14 is placed with its web horizontal and is attached to the top face of the bases 10 at their outer ends, and is further connected to said bases by means of gusset plates 16 which stiffen the frame as a whole and keep the inwardly projecting ends of the bases 10 at all times at right angles to the longitudinal connecting bars 13 and 14. The channel bar 15 is also placed with its web vertical and is connected by angle plates 15ª to the inner faces of the uprights or standards 12 some distance above their bases.

Thus each of the oppositely facing members of the loading device is in effect a skeleton frame of such length that it spans the truck and does not come in contact with the same at any point, and with the inner faces of the uprights or standards 12 and the upper faces of the inwardly projecting portions of the bases 10 approximately in form the inner faces of the uprights 6 and the tie supporting bed of the truck or tram to be loaded, but so positioned with reference to the latter that when the ties fall down (broadside) from the delivery mechanism above, they fall upon the loading device and not upon the truck. As they fall into the loading device workmen position them until a pile is built up which entirely fills the space enclosed by the frames of the loading device, and somewhat rounded on top. The assembled ties are then secured to the truck or frame, such, for instance, as by passing bails or chains 17 over the load and fastening the ends thereof to the upper ends of the uprights or standards 6 of the truck, as fully described in my co-pending application. The two members of the loader are then separated, that is, are moved apart until their inner ends clear the truck or tram being loaded. The loaded truck or tram is then pushed out of the way, an empty one is brought into position, the two loading members are then again brought together, so as to span the new truck or tram, and the operation repeated. In this way, the loading is done without danger to the workmen and with a minimum amount of manual labor.

The two members of the loader can be moved toward and from each other by any suitable mechanism. In an actual installation air cylinders 18, connected by their piston rods 19 to the two members respectively, have been satisfactorily used and this is the means illustrated in the drawings. Any other suitable means will, however, answer the purpose. Universal joints 20 are included in the piston rods 19 to allow for some out-of-right-line movement of the loader members.

To make it easier to move the loader members, and easier to hold them in closed position, the track 2 is preferably formed as shown in Fig. 2, that is, provided with a central portion 21 which is horizontal for a distance equal to the lengths of the wheel bases of the two loader members, and with downwardly sloping portions 22 at the sides of this central portion, so that after the members have been started outwardly they complete the remainder of their movement substantially by gravity. To allow the loader to be withdrawn from under a load of ties with a minimum amount of power the top surfaces of the inwardly projecting ends of the bases 10 are slightly inclined, as shown at 23, that is to say, they are lower at the inner ends of the bases than they are at the feet of the uprights 12. Consequently, the act of separating the loader members is substantially that of withdrawing wedges from underneath the load of ties.

To assist in holding the loader members in their closed position without the exercise of power, holding blocks 24 are used. There are two of these, positioned in the track rails 2, at the center of the track 1. The tops of these blocks are provided on their opposite sides with upwardly sloping faces 25, followed by short horizontal faces 26, and by a central rib 27. When the two loading members come together the inner ends of the bases 10 slide up the inclined faces 25 of the blocks until they rest upon the horizontal face 26 and come to stop both because they abut the central rib 27 of said blocks and because of the abuttting of their buffer projections 28. This riding of the ends of the bases 10 up onto the blocks 24 causes the inner wheels 11 of the loader members to be lifted from their tracks, as shown in Fig. 2. Consequently these members are held in this position by the friction of the inner ends of their bases on the horizontal faces 26 of the blocks 24 and this prevents their accidental separation. When, however, these members are forcibly pulled apart, the first movement causes the ends of the bases 10 to slide off the blocks 24 and thus to slightly drop, and almost immediately the outer rollers of the bases come onto the inclined track portion 21, after which the members separate practically by gravity. The result is that while it requires considerable power to initiate the separation of the loader members, the further movement is substantially free.

The operation and advantages of the device are clear from the foregoing description.

I claim:

1. A truck loading device comprising a pair of oppositely facing laterally movable skeleton frames, each including connected end portions spaced apart a distance greater than the length of the truck to be loaded and comprising bases with uprights at their outer ends.

2. A truck loading device consisting of a pair of oppositely facing laterally movable skeleton frames, each comprising end portions spaced apart a distance greater than the length of the truck to be loaded, and means connecting said end portions, said end portions having bases projecting inwardly from the connecting means and uprights at the outer ends of said bases.

3. A truck loading device comprising a pair of oppositely facing laterally movable members each comprising end portions consisting of bases and uprights on their outer ends, and means connecting said end portions and lying outside of the inner faces of the uprights.

4. A truck loading device comprising a pair of oppositely facing laterally movable members, each comprising end portions consisting of bases and uprights on their outer ends, and means connecting said end portions and lying outside of the inner faces of the uprights, said end frames being spaced a distance apart greater than the length of the truck to be loaded.

5. A truck loading device comprising a pair of oppositely facing laterally movable members, each comprising end portions consisting of bases and uprights on their outer ends, and means connecting said end portions outside of the inner faces of the uprights, the upper surfaces of said bases sloping from their inner ends upwardly to the feet of the uprights.

6. A truck loading device comprising a pair of oppositely facing laterally movable members, each comprising end portions consisting of bases and uprights on their outer ends, and means connecting said end portions outside of the inner faces of the uprights, and stops in position to be engaged by the inner ends of the bases of said end frames when the loader members are brought together, said stops having inclined top faces onto which the ends of the bases ride and by which they are lifted.

7. A truck loading device comprising a pair of oppositely facing laterally movable members, each comprising end portions consisting of bases and uprights on their outer ends, and means connecting said end portions outside of the inner faces of the uprights, and stops in position to be engaged by the inner ends of said bases when the loader members are brought together, said stops having inclined top surfaces onto which the ends of the bases ride and by which they are lifted, the upper faces of the bases of the end frames being inclined upwardly from their inner ends to the feet of the uprights.

8. A truck loading device comprising a pair of oppositely facing laterally movable members, a track on which said members move, said track being horizontal at the loading place and downwardly inclined at both sides thereof, mechanism for moving said members toward and from each other on said track, and stops for arresting the approaching movements of said members at a fixed position.

9. A truck loading device comprising a pair of oppositely facing laterally movable members, a track on which said members move, said track being horizontal at the loading place and downwardly inclined at both sides thereof, mechanism for moving said members toward and from each other on said track, and stops for arresting the approaching movements of said members at a fixed position, said stops being provided with inclined faces onto which the inner ends of said members ride and by which they are lifted.

10. A truck loading arrangement comprising a track for the trucks to be loaded, a track at right angles to the first named track, and a loading device movable on the last named track and comprising a pair of oppositely facing members having forwardly projecting bases and uprights at their outer ends, the ends of said members being spaced apart a distance greater than the length of the truck to be loaded.

11. A truck loading arrangement comprising a track for trucks to be loaded, a track at right angles to the first named track, and a loading device movable on the last named track and comprising a pair of oppositely facing members having forwardly projecting bases with uprights at their outer ends, the ends of said members being spaced apart a distance greater than the length of the truck to be loaded, said second named track being horizontal at the loading place for a distance as great as the combined lengths of the end bases of the two movable members and downwardly inclined at both sides of said horizontal portion.

12. A truck loading arrangement comprising a track for the trucks to be loaded, a track at right angles to the first named track, a loading device movable on the last named track and comprising a pair of oppositely facing members having forwardly projecting bases with uprights at their outer ends, the ends of said members being spaced apart a distance greater than the length of the truck to be loaded, and stops in the center of the first named track, said stops having inclined faces onto which the inner ends of said members ride and by which they are lifted.

13. A truck loading arrangement comprising a track for the trucks to be loaded, a track at right angles to the first named track, a loading device movable on the last named track and comprising a pair of oppositely facing members having forwardly projecting bases with uprights at their outer ends, the ends of said members being spaced apart a distance greater than the length of the truck to be loaded, said second named track being horizontal at the loading place for a distance as great as the combined lengths of the end bases of the two movable members and downwardly inclined at both sides of said horizontal portion, and stops in the center of the first named track, said stops having inclined faces onto which the inner ends of said members ride and by which they are lifted.

In testimony whereof, I sign my name.

GRANT B. SHIPLEY.